United States Patent [19]

Miura et al.

[11] Patent Number: 4,884,472
[45] Date of Patent: Dec. 5, 1989

[54] AUTOMATIC TRANSMISSION

[75] Inventors: Masakatsu Miura, Kariya; Mashiko Ando, Okazaki, both of Japan

[73] Assignee: Aisin-Warner Kabushiki Kaisha, Anjo, Japan

[21] Appl. No.: 127,354

[22] Filed: Dec. 1, 1987

[30] Foreign Application Priority Data

Dec. 9, 1986 [JP] Japan .................................. 61-293664

[51] Int. Cl.⁴ ............................................... F16H 57/10
[52] U.S. Cl. ....................................... 74/763; 74/606 R
[58] Field of Search ....................... 74/762, 763, 606 R

[56] References Cited

U.S. PATENT DOCUMENTS

| | | | |
|---|---|---|---|
| 2,953,946 | 9/1960 | Simpson | 74/762 |
| 3,314,307 | 4/1967 | Egbert | 74/763 X |
| 3,701,623 | 10/1972 | Mori et al. | 74/763 X |
| 4,224,837 | 9/1980 | Croswhite | 74/763 X |
| 4,226,123 | 10/1980 | Croswhite | 74/763 X |
| 4,331,044 | 5/1982 | Bookout et al. | 74/762 X |
| 4,400,998 | 8/1983 | Bookout et al. | 74/763 X |
| 4,468,982 | 9/1984 | Fujita | 74/762 |
| 4,602,522 | 7/1986 | Dorpmund | 74/762 X |
| 4,747,323 | 5/1988 | Kiuchi et al. | 74/763 |

FOREIGN PATENT DOCUMENTS

| | | | |
|---|---|---|---|
| 143350 | 6/1985 | European Pat. Off. | 74/763 |
| 61-241550 | 10/1986 | Japan | 74/763 |

Primary Examiner—Dwight G. Diehl
Attorney, Agent, or Firm—Kanesaka and Takeuchi

[57] ABSTRACT

An automatic transmission having Ravigneaux Type planetary gear unit comprises a first and a second sun gear, a long pinion meshing the first sun gear, a short pinion meashing the long pinion and the second sun gear, a carrier supporting the long pinion and the short pinion and a ring gear meshing the long pinion;

the input shaft connects the second sun gear through a first clutch, and connects the first sun gear through a second clutch;

the output member is located in the center of the automatic transmission mechanism so that the output member encloses the input shaft;

in case of three speed transmission mechanism, a first clutch is located axially and extreme outside the transmission mechanism;

in case of four speed transmission mechanism a third clutch is located axially and outside the first clutch.

4 Claims, 12 Drawing Sheets

FIG.3

|   | $C_1$ | $C_2$ | $B_1$ | $B_2$ | $F_1$ |
|---|---|---|---|---|---|
| 1ST | ○ |   |   | (○) | ○ |
| 2ND | ○ |   | ○ |   |   |
| 3RD | ○ | ○ |   |   |   |
| REV |   | ○ |   | ○ |   |

FIG.5

|   | $C_1$ | $C_2$ | $C_0$ | $B_1$ | $B_2$ | $F_1$ |
|---|---|---|---|---|---|---|
| 1ST | ○ |   |   |   | (○) | ○ |
| 2ND | ○ |   |   | ○ |   |   |
| 3RD | ○ |   | ○ |   |   |   |
| 4TH |   |   | ○ | ○ |   |   |
| REV |   | ○ |   |   | ○ |   |

FIG.7

|  | AUTOMATIC TRANSMISSION MECHANISM | | | | | ADDITIONAL TRANSMISSION MECHANISM | |
|---|---|---|---|---|---|---|---|
|  | $C_1$ | $C_2$ | $B_1$ | $B_2$ | $F_1$ | $C_3$ | $B_4$ |
| 1ST | O |  |  | (O) | O |  | O |
| 2ND | O |  | O |  |  |  | O |
| 3RD | O |  | O |  |  | O |  |
| 4TH | O | O |  |  |  | O |  |
| REV |  | O |  | O |  |  | O |

FIG.9

|  | AUTOMATIC TRANSMISSION MECHANISM | | | | | | ADDITIONAL TRANSMISSION MECHANISM | |
|---|---|---|---|---|---|---|---|---|
|  | $C_1$ | $C_2$ | $C_0$ | $B_1$ | $B_2$ | $F$ | $C_3$ | $B_4$ |
| 1ST | O |  |  |  | (O) | O |  | O |
| 2ND | O |  |  | O |  |  |  | O |
| 3RD | O |  |  | O |  |  | O |  |
| 4TH | O |  | O |  |  |  | O |  |
| 5TH |  |  | O | O |  |  | O |  |
| REV |  | O |  |  | O |  |  | O |

FIG.13

|   | $C_1$ | $C_2$ | $B_1$ | $B_2$ | $B_3$ | $F_1$ | $F_2$ |
|---|---|---|---|---|---|---|---|
| 1ST | ○ | | | (○) | | ○ | |
| 2ND | ○ | | (○) | | ○ | | ○ |
| 3RD | ○ | ○ | | | | | |
| REV | | ○ | | ○ | | | |

FIG.15

|   | $C_1$ | $C_2$ | $C_0$ | $B_1$ | $B_2$ | $B_3$ | $F_1$ | $F_2$ | $F_0$ |
|---|---|---|---|---|---|---|---|---|---|
| 1ST | ○ | | | | (○) | | ○ | | |
| 2ND | ○ | | | (○) | | ○ | | ○ | |
| 3RD | ○ | | ○ | | | | | | ○ |
| 4TH | | | ○ | ○ | | | | | |
| REV | | ○ | | | ○ | | | | |

AUTOMATIC TRANSMISSION

BACKGROUND OF THE INVENTION

1. Field of the Invention

The present invention relates to an automatic transmission exclusively for an automobile used with torque converter, particularly to a structure of an automatic transmission mechanism.

2. Description of the Prior Art

An automatic transmission, in general, comprises two single planetary gear units, a sun gear which is used in common for said two single planetary gear units, a carrier of a first planetary gear unit and a ring gear of a second planetary gear unit which are connected together. The above structure is so-called simpson type in which driving force is input to a ring gear of said first planetary gear unit and/or said sun gear selectively, and said rotatory components of the planetary gear units are restrained by a brake or a one-way clutch, and output is taken from said ring gear of the second planetary gear unit which is coupled with said carrier of the first planetary gear unit. Then, forward three speeds are obtained.

A four speed automatic transmission is structured based on said forward three speed automatic transmission mechanism comprising two single planetary gear units. In addition to said three speed automatic transmission mechanism, by adding an over-drive mechanism or under-drive mechanism having one planetary gear unit, forward four speeds are obtained.

An automatic transmission mechanism adding an over-drive mechanism is axially long because an output member of an over-drive mechanism, i.e. a ring gear is connected axially by an input member of said three speeds automatic transmission.

On the other hand, said automatic transmission mechanism adding an over-drive mechanism has a counter drive gear (output) at the end of an output shaft ( farthest end from an input portion ) from which driiving force is transmitted to said under-drive mechanism placed under said three speed automatic transmission mechanism.

Recently, an automatic transmission has been required to make its mechanism small and to increase its horse power, however, said four speed automatic transmission having three planetary gear units with said over-drive mechanism can not satisfy such requirements.

Then, adding a clutch to connect or disconnect an input shaft and a carrier to obtain forward four speed is proposed, this addition of said clutch is for ravigneaux type planetary gear unit comprising a first sun gear, a second sun gear, a long pinion meshing said first sun gear, a short pinion meshing said long pinion and said second sun gear, a carrier supporting said long and said short pinion, and a ring gear meshing said long pinon.

The above said four speed automatic transmission can not satisfy a requirement to make its mechanism small because the structure of simpson type automatic tranmssion is axially long, i.e., driving force is input to one end and taken from the other end of mechanism and both gear units are separated.

Furthermore, for said ravigneaux type automatic transmission, comparing with that of simpson type, axial mechanical length can be shortened but the above requirements are not satisfied, yet, because ouput elements or a hydraulic pump are laid at the end of the shaft where replacement and modification can be done easily. Accordingly three speed and four speed of automatic transmission have to be manufactured respectively. Due to the above, it is difficult to manufacture parts, and assemble them in common for said three speed and four speed of transmission mechanisms, so, cost increase is inevitable, and such structure of an automatic transmission can not cope with recent wide variation trend.

SUMMARY OF THE INVENTION

While the present invention is believed to be readily understood from the above description, a brief summary will now be set forth.

Explanation with be given in accordance with FIG. 1, an automatic transmission comprises planetary gear units (2), an input shaft (5) connecting rotatory components of said planetary gear units through clutches, output member (9) connecting a rotatory component ($R_1$), a restraining means to restrain rotatory components ($S_1$), ($CR_1$). Said output member (9) encloses said input shaft (5) and is laid in the center of said automatic transmission mechanism. In case of a three speed automatic mechanism ($10_1$), a first clutch ($C_1$) is laid outside said planetary gear unit (2). ( Refer to lower half of line 1—1 in FIG. 1. )

On the other hand, in case of a four speed automatic transmission mechanism ($10_2$), third clutch ($C_0$) which works at over drive condition is laid outside said first clutch ($C_1$). ( Refer to upper half of line 1—1 in FIG. 1.) Said planetary gear unit (2) comprises, as shown in FIG. 1, 2, 4, said first sun gear ($S_1$), a second sun gear ($S_2$), a long pinion ($P_1$) meshing said first sun gear ($S_1$), a short pinion ($P_2$) meshing said long pinion ($P_1$) and said second sun gear ($S_2$), said carrier ($CR_1$) supporting said long pinion ($P_1$) and said short pinion ($P_2$), and said ring gear ($R_1$) meshing said long pinion ($P_1$).

In said three speed automatic transmission mechanism ($10_1$), as shown in FIG. 1 ( lower half of line 1—1 ) and FIG. 2, said first sun gear ($S_1$) is restrained by restraining means ( for example, first brake ($B_1$) ), said carrier ($CR_1$) is restrained by restraining means ( for example, a second brake ($B_2$) and a first one way clutch ($F_1$) ), said input shaft (5) connects said second sun gear ($S_2$) through said first clutch ($C_1$) and to said first sun gear ($S_1$) through a second clutch ($C_2$), and said ring gear ($R_1$) connects to said output member (9).

In said four speed automatic transmission mechanism ($10_2$), as shown in FIG. 1 ( upper half of line 1—1 ) and FIG. 4, a third clutch ($C_0$) to connect said input shaft (5) and said carrier ($CR_1$) is installed axially outside said first clutch ($C_1$) on the structure of said three speed automatic transmission mechanism ($10_1$).

Base on the above structure, said three speed automatic trasmissin mechanism ($10_1$) is shifted to forward three speeds, reverse one speed by function of said clutches ($C_1$), ($C_2$, said restraining means ($B_1$), ($B_2$) and said one-way clutch ($F_1$). Said four speed automatic transmission mechanism ($10_2$) is shifted to forward four speed and reverse one speed by function of clutchs ($C_1$), ($C_2$), ($C_0$), said restraining means ($B_1$), ($B_2$) and said one-way clutches ($F_1$). Driving force generated in such transmissions is taken from said output portion (9) and transmitted to additional transmission mechanism.

Furthermore, said three speed automatic transmission mechanism ($10_1$) which is shown in FIG. 1 ( lower half of line 1—1 ) and FIG. 2 operates as shown in FIG. 3.

In forward first speed, said first clutch ($C_1$) is connected. The rotation of said input shaft (5) is transmitted to said second sun gear ($S_2$), and said rotation of said sun gear ($S_2$) is transmitted to ring gear ($R_1$) through short pinion ($P_2$) and long pinion ($P_1$) as reduced rotation speed because said carrier ($CR_1$) is restrained by said first one-way clutch ($F_1$). Said rotation ( reduced rotative speed ) is taken from said output member (9).

In second speed, said first brake ($B_1$) (second) is applied in addition to connection of said first clutch ($C_1$). As long pinion ($P_1$) is restrained by said first sun gear ($S_1$) which is restrained by said brake ($B_1$), the rotation of said second sun gear ($S_2$) makes said short pinion ($P_2$) rotate and also rotate said carrier ($CR_1$), then said rotatory speed is taken from said output member (9) through long pinion ($P_1$).

In third speed, said second clutch ($C_2$) is connected in addition to said first clutch ($C_1$). The rotation of said input shaft (5) is transmitted to said second sung gear ($S_2$) through said first clutch ($C_1$) and said sun gear ($S1$) through said second clutch ($C_2$). Due to the above, said components of planetary gear unit (2) rotate together, then, rotation same as that of said input shaft (5) is taken from said output member (9).

In reverse condition, said second clutch ($C_2$) and said second brake ($B_2$) (1st. reverse ) work. The rotation of said input shaft (5) is transmitted to said first sun gear ($S_1$) through said clutch ($C_2$) and the rotation of the sun gear ($S_1$) is transmitted to said ring gear ($R_1$) through said long pinion ($P_1$) in reverse because said carrier (CR) is fixed by said second brake ($B_2$).

In first speed of coasting condition, said one-way clutch ($F_1$) is free, said second brake ($B_2$) is applied in addition to said first clutch ($C_1$). By said brake ($B_2$), said ring gear ($R_2$) is fixed, and first speed condition is remained and engine brake works efficiently.

On the other hand, said four speed automatic transmission ($10_2$) as shown in FIG. 1 ( upper half of line 1—1 ) and FIG. 4 operates in accordance with the operation table in FIG. 5. In case of first, second and reverse speed, explanation is eliminated because the motions of said components are same as said three speed automatic transmission ($10_1$).

In third speed, said third clutch ($C_0$) is connected in addition to said first cluch ($C_1$). Said second sun gear ($S_2$) rotates through said first clutch ($C_1$), and said carrier ($CR_1$) also rotates through said third clutch ($C_0$). Said components of said planetary gear unit (2) rotate together, and driving force is transmitted to said output member (9).

In fourth speed, said third brake ($C_0$) keeps connecting and said first brake ($B_1$) works. Said carrier ($CR_1$) rotates through said clutch ($C_0$), and said long pinion ($P_1$) rotates because of said first sun gear ($S_1$) being restrained by said brake ($B_1$). The rotation of said carrier (CR) and said pinion ($P_1$) is combined and taken from said ring gear ($R_1$) as increased rotation. This over-drive rotation is taken from said output member (9).

In said three speed automatic transmission ($10_1$) and said four speed automatic tranmission ($10_2$), the rotation of said ring gear ($R_1$) is transmitted to said ouput member (9) laid in the center of said mechanism. Furthermore, said rotation is also transmitted to an additional transmission mechanism from said output member ( counter drive gear ).

All numbers and symbols in parentheses in "summary of the invention" are for reference purpose and do not define claims.

BRIEF DESCRIPTION OF DRAWINGS

FIG. 3 is a table showing an operation of said three speed automatic transmission;

FIG. 5 is a table showing an operation of said four speed automatic transmission;

FIG. 7 is a table showing an operation of said embodiment;

FIG. 9 is a table showing an operation of another embodiment;

FIG. 13 is a table showing an operation table of said transmission mechanism shown in FIG. 11;

FIG. 15 is a table showing an operation of said automatic transmission the embodiment of FIG. 14.

DESCRIPTION OF THE PREFERRED EMBODIMENT

Figure 1:
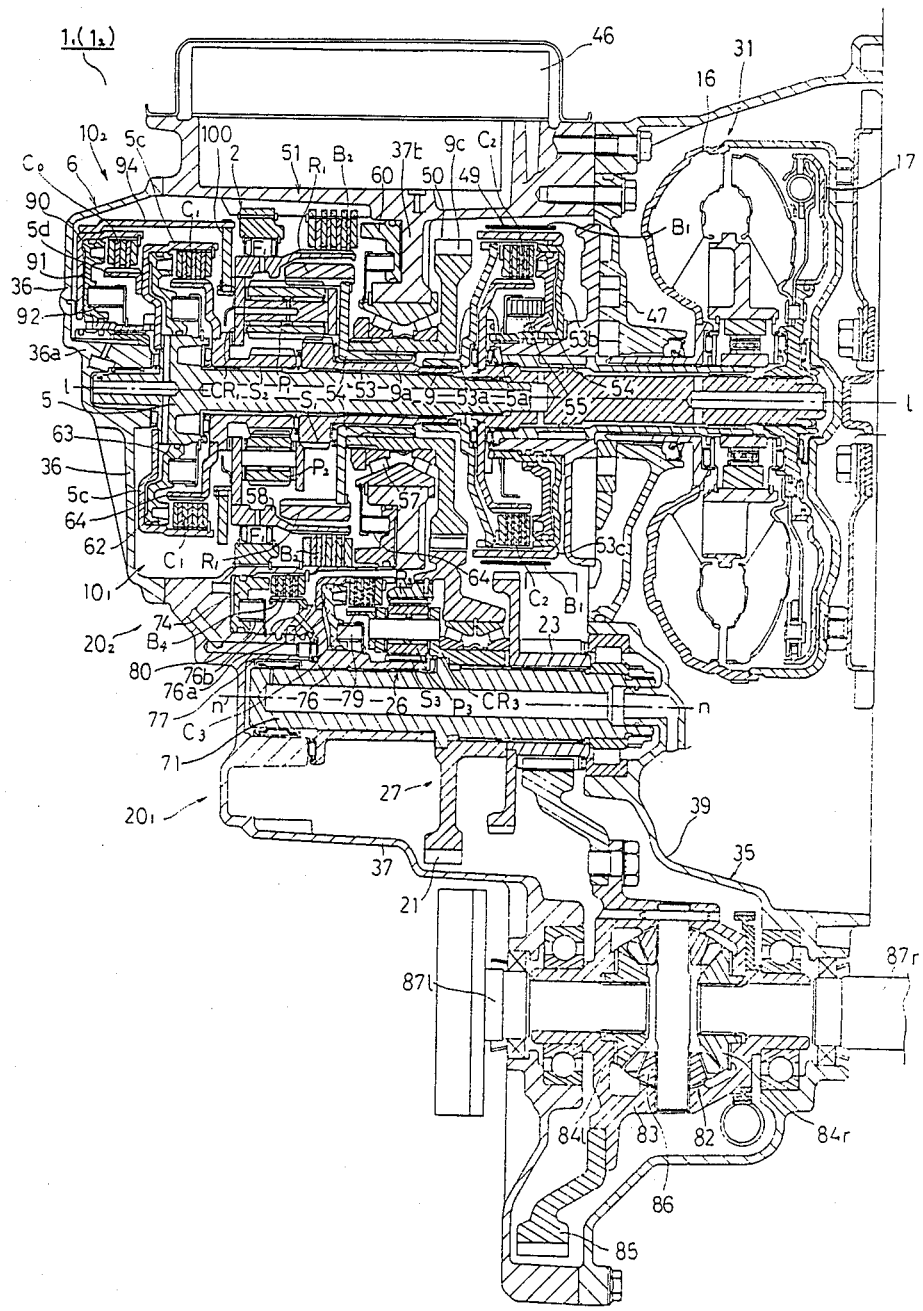
FIG. 1 is a cross sectional view of an automatic tranmission of the present invention, different structures are shown respectively upper and low part of lines 1—1 and n—n.

Explanation is given in accordance with the drawings. An automatic transmission $1_2$ having three speed automatic transmission mechanism $10_1$ ( lower portion of line 1—1 of FIG. 1) comprises a torque converter portion 31, a three speed automatic transmission mechanism $10_1$, an additional transmission mechanism $20_2$ ( or $20_1$ ) and a differential portion 35 each of which is contained in a trans axle housing 39, a trans axle case 37 and a transaxle cover 36. Said converter portion 31 comprises a torque conveter 16 and a lock-up clutch 17. Driving force is transmitted from an engine crank shaft 15 (FIG. 2) to an input shaft 5 in said automatic transmission mechanism $10_1$ through oil flow in said torque converter 16 or mechnical direct connection of said lock-up clutch 17. A valve body 46 is installed on the upper part of said transaxle case 37, and oil pump 47 is laid between automatic trasmission mechanism $10_1$ and said troque conveter portion 31.

In said three speed automatic transmission mechanism $10_1$, from inside to outside axially, a control portion 49, an output portion 50, planetary gear unit portion 51 and a clutch portion 6 are arranged.

A planetary gear unit portion 51 comprises two sun gears $S_1$, $S_2$, a ring gear $R_1$ and a planetary gear unit 2 having a carrier CR supporting a long pinion $P_1$ and a short pinion $P_2$. Said first sun gear $S_1$ whose boss 53 covers said input shaft 5 extends to said control portion 49, and meshes said long pinion $P_1$. Said ring gear $R_1$ which meshes said long pinion $P_1$ connects boss 9a of an output member 9 ( counter drive gear ) through coupling part 54 supported with rotation free by said sun gear boss 53. Said second sun gear $S_2$ meshes said short pinion $P_2$, and said short pinion $P_2$ meshes said long pinion $P_1$.

Said control portion 49 has a second clutch $C_2$ and a first brake $B_1$. Said second clutch $C_2$ is laid between a flange 5a built up from said input shaft 5 and a flange 53a built up from the edge of a hollow shaft 53, and a cylinder 53b is laid at the opposite side of said flange 53a in said control portion 49. A piston 48 is inserted in said cylinder 53b, and a spring 55 is installed on the back side of said piston 48. This structure works as a hydraulic accutuator for said second clutch $C_2$. At the circumference of said flange 53a, a brake drum 53c is fixed to connect or disconnect said first brake $B_1$ comprising a band brake.

Said output portion 50 which is laid in the center of said automatic transmission mechanism $10_1$ has said output member 9 having a boss-portion 9a and an output gear 9c ( counter drive ). Said output member 9 can rotate freely and is supported by a separator 37b through a bearing 57 which is double tapered roller bearing having two inner laces through an outer lace and a spacer ring which are fixed to separator 37b by spline. On the other hand, a drum 58 extends from said carrier $CR_1$ as if it would cover said long pinion $P_1$ and said ring gear $R_1$. Said second brake $B_2$ ( multi plate type ) and first one-way clutch $F_1$ are located between said drum 58 and case 37. On the wall of separator 37b, a piston 60 is inserted for making up an actuator of said second brake $B_2$, and a return spring 64 is installed between said piston 60 and a ring fixed on an outer lace.

Figure 10:
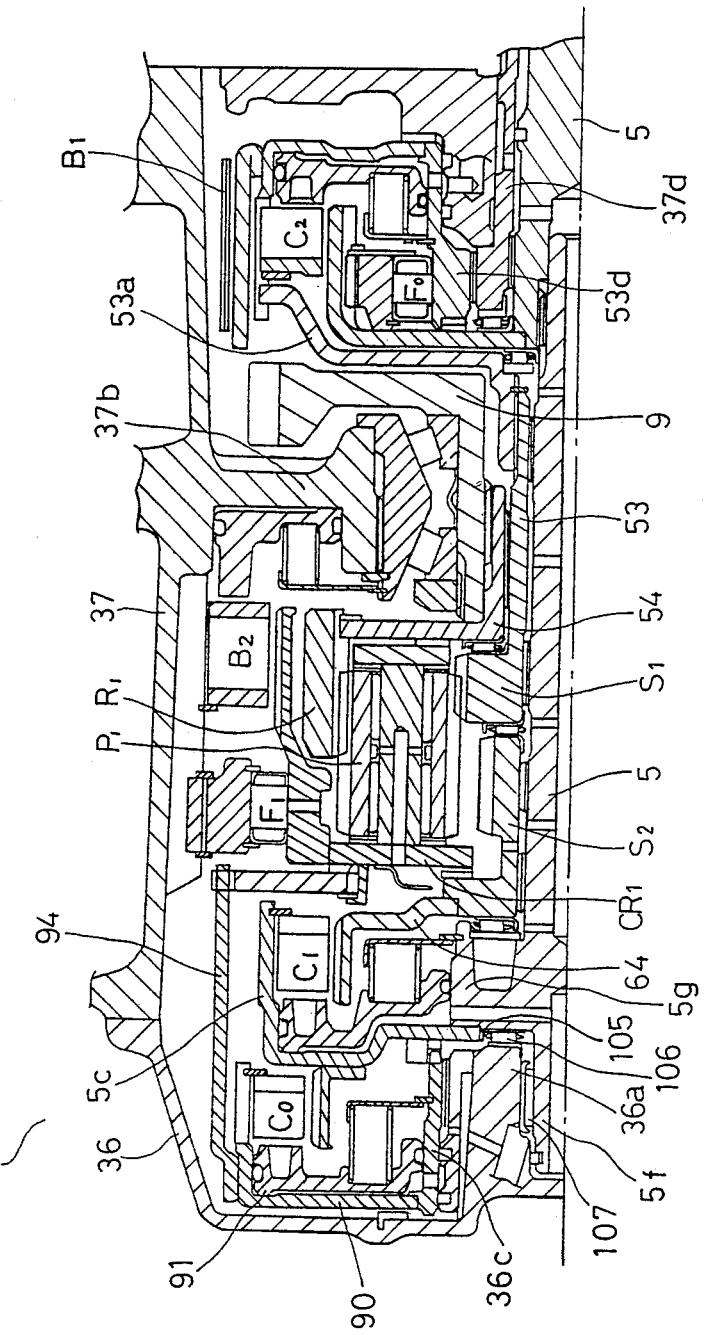
FIG. 10 is a cross sectional view of partially modified automatic transmission mechanism.

Said clutch portion 6 having first clutch $C_1$ (forward) is located at an edge of said automatic transmission mechanism $10_1$ and is housed in said trans axle case 36. Flange 5c On the input shaft 5, a thin top section 5f and an extrusion 5g which is contiguous to the thin top section 5f and extends from the input shaft 5, are formed (FIG. 10). A flange 5c is fixed to the extrusion 5g. The flange 5c, in which movable member 62 is inserted, is fixed at the edge of said input shaft 5, so that a hydraulic actuator for said clutch $C_1$ is made. On the section of extrusion 5g just below the flange 5c, a washer 105 is installed. A thrust bearing 106 is situated between the end of the brim 36a and the extrusion 5g through the washer 105. Furthermore, an inner circumference of the brim 36a supports the thin top section 5f through a bearing 107. Said clutch $C_1$ is laid between an inside of a flange 5c and an outside 64 of said second sun gear $S_2$, and a return spring is installed between said piston member 62 and a back side stop ring. The washer 105 and the bearings 106 and 107 are commonly used for both three forward speed automatic transmission mechanism and four forward speed automatic transmission which is explained later.

Figure 2:
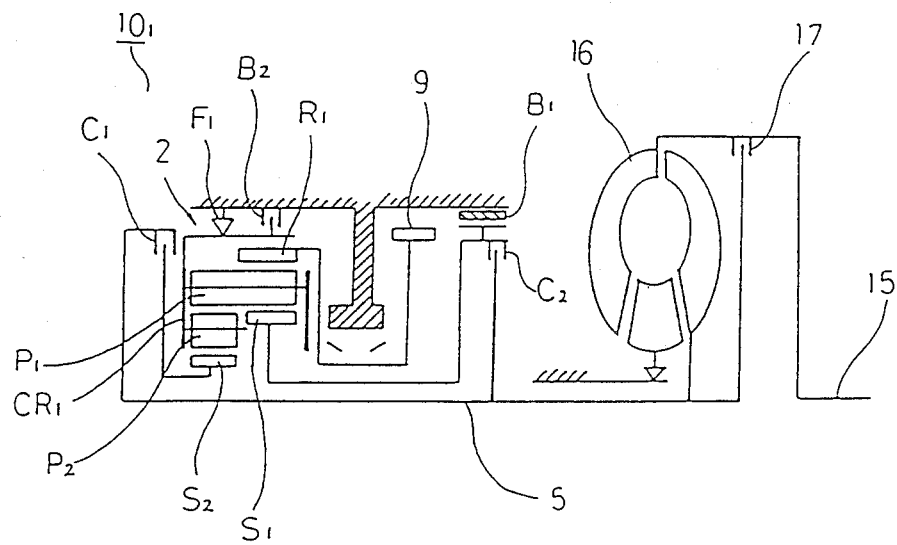
FIG. 2 is a schematic view of three speed automatic transmission mechanism.
Figure 4:
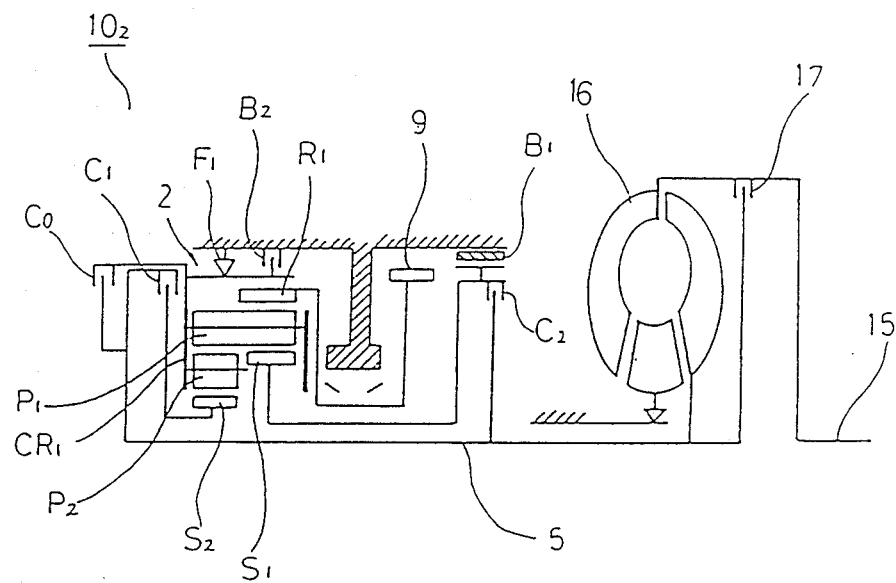
FIG. 4 is a schematic view of four speed automatic tranmission mechanism.

Said additional transmission $20_2$, as shown in FIG. 1 ( upper half of line n—n ), has a counter shaft 71 ( rotation free ) which is supported by said axle case 37. At the edge of said shaft 71, singel planetary gear unit 26 for under drive is installed. A differential drive pinion 23 is connected and supported on said shaft 71, and a couter driven gear 21 meshing a counter drive gear 9 is supported by a bearing on said shaft 71 with rotatin free. Said planetary gear unit 26 comprises a carrier $CR_3$, which supports a sun gear $S_3$ and a pinion $P_3$, and is connected to said shaft 71, and ring gear $R_3$ which is connected with said counter driven gear 21. A boss portion 76 on which said sun gear $S_3$ is made connects flange 76a, 76b, and is free rotationally supported by said shaft 71. A fourth brake $B_4$ which is installed on said flange 76b is controlled by a hydraulic actuator 74 made on said case 37. A fourth clutch $C_3$ which is controlled by a hydraulic actuator 77 made in said flange 76a is laid between an inner circumference of said flange 76a and said carrier $CR_3$ of said gear unit 26. Numerals 79 and 80, in FIG. 1, are return springs of a hydraulic actuator.

A differential portion 35 has a differential unit 82 and a ring gear mount case 83. Said mount case 83 fixes a ring gear 85 meshing a differential drive gear 23, and makes up a differential carrier supporting a differential pinion 86 of differential gear unti 82. Said gear unti 82 has side gears 84l and 84r meshing said pinion 86, and these side gears connect front axles 87l and 87r.

In lower half of line n—n in FIG. 1, a reduction gear mechanism 27 connecting said counter driven gear 21 and said differential drive gear 23 is shown as said additional transmission $20_1$.

Figure 6:
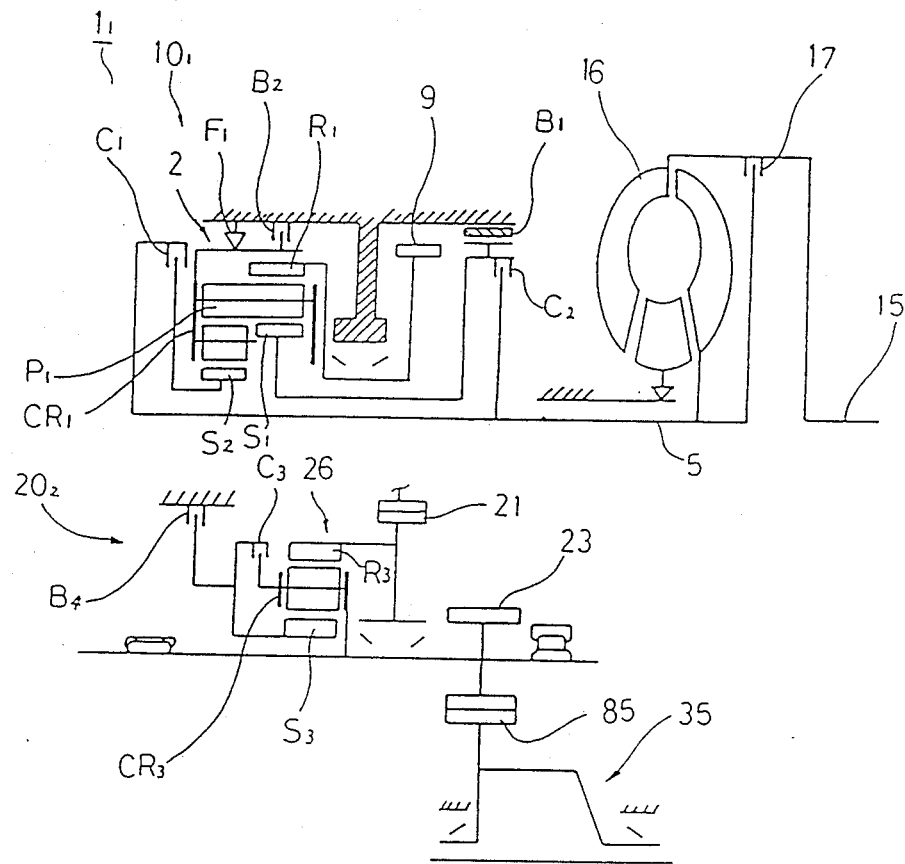
FIG. 6 is a schematic view of an embodiment of an automatic tranmission.

The motion of the above embodiment is explained in accordance with FIG. 6 and FIG. 7. Driving force is transmitted to said input shaft 5 of said three speed automatic transmission mechanism $10_1$ through said torque converter 16 or lock-up clutch 17. In said automatic transmission mechanism $10_1$, forward three speed, reverse one speed are obtained based on the motion of each clutch $C_1$, $C_2$, each brake $B_1$, $B_2$, and one-way cltuch $F_1$, and furthermore, said rotation is transmitted to said counter driven gear 21 of said additional transmission mechanism $20_2$ from said counter drive gear 9. In said additional transmission mechanism $20_2$, direct-coupling and under drive conditions are obtained by the motion of said clutch $C_3$ and brake $B_4$ as shown in FIG. 7. By the combination of said automatic transmission mechanism $10_1$ and said additional transmission mechanism $20_2$, forward four speed ( at maximum, six speed are avialble ) is obtained. In other words, said mechanism $10_1$ is first and second speed, and said mechanism $20_2$ is under drive condition, so that it makes first and second speed from automatic transmission as a whole. Futhermore, said mechanism $10_1$ is second speed, said mechanism $20_2$ is direct coupling, so that it makes third speed from automatic transmission as a whole. By switching second speed to third speed in said mechanism $10_2$, ( mechanism $20_2$ is unchanged. ), fourth sepeed is obtained from automatic transmission as a whole. Said forward four speed is transmitted to said front axles 87l and 87r from said differentail gear unit 86 through said differntial drive pinion 23 and said ring gear 85.

Next explantion is given to an automatic tranmission $1_2$ having four speed transmission mechanism $10_2$ in accordance with FIG. 1 ( upper half of line 1—1 ). For the portions except those of clutches 6, explanation is eliminated because they are identical.

Said automatic transmission $1_2$ has said four speed automatic transmission mechanism $10_2$ which has a clutch portion 6 covered by said trans axle cover 36. In said clutch portion 6, said third clutch $C_0$ is laid coaxially, outside said first clutch $C_1$, so that the structure is axially longer for the width of clutch $C_0$ than said automatic transmission mechanism $10_1$. An inner extrusion 36a made on said trans axle cover 36 free rotationally supports a tubular member 36c, which in turn supports a flange 90. A piston 91 is retained in the flange 90 to make up a hydraulic actuator for third clutch $C_0$. At an outside of said flange 90, a drum 94 covers an outer surface of said first clutch $C_1$ and a top edge of the drum 94 is connected by slits of a member 100 built up from said carrier $CR_1$ of said gear unit 2. A third clutch $C_0$ is laid between said flange 90 and a hub 5d fixed by said flange 5c of said input shaft 5, and at an inner side of said clutch $C_0$, a return spring 92 for actuator 91 is installed.

Figure 8:
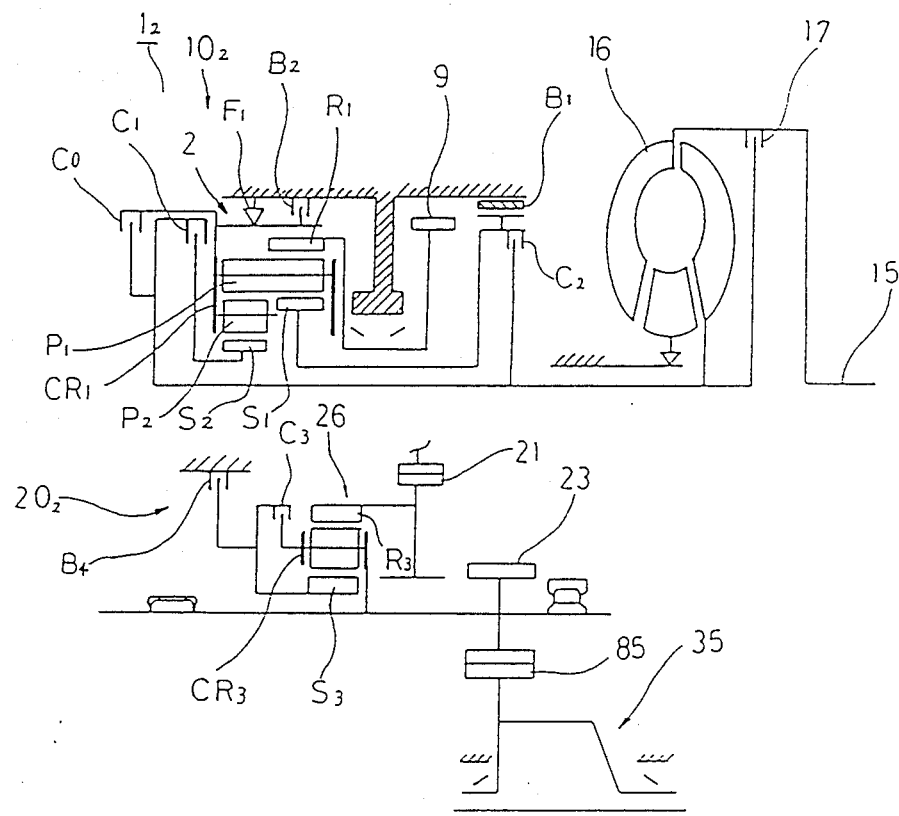
FIG. 8 is a schematic view of another embodiment of an automatic tranmission.

The motions of the above embodiment is also explained in accordance with FIG. 8 and FIG. 9. Driving force is transmitted to said input shaft 5 through said torque converter portion 31, and at four speed automatic trasmission mechanism $10_2$, forward four speed and reverse one speed are obtained due to the motion of clutch $C_1$, $C_2$, $C_0$, each brake $B_1$, $B_2$ and a one-way clutch $F_1$ in accordance with the operation shown in FIG. 5. Said rotation brought from said mechanism $10_2$ is shifted to direct coupling and under drive condition due to the motion of clutch $C_0$ and brake $B_4$ in accordance with the operation shown in FIG. 9. Because of the combination of said mechanism $10_2$ and said additional mechanism $20_2$, forward 5 speed ( at maximum, 8 speed is available ) is obtained from transmission as a whole. In other words, first speed in said mechanism $10_2$ and under drive in said mechanism $20_2$, so that first speed is obtained from whole tranmission mechanism. Furthermore, by shifting said mechanism $10_2$ to second speed ( mechansim $20_2$ is unchanged. ), second speed is obtained from whole transmission mechanism. By shifting additional said mechanism $20_2$ to direct coupling ( mechanism $10_2$ is kept at second speed.), third speed is obtained from whole transmision mechnism. Under said direct coupling condition of said additional mechamism $20_2$, by shifting said mechanism $10_2$ to third and fourth speed, then, fourth and fifth speed are obtained from whole transmission mechanism, and consequently a forward five speed automatic transmission $1_1$ is obtained.

Said three speed automatic transmission mechanism $10_1$ and said four speed automatic transmission mechanism $10_2$ can be combined with said additional transmission mechanism $20_1$ having a reduction gear mechanism 27 to obtain forward three and four speed automatic transmission as a whole.

The partially modified embodiment is explained in accordance with FIG. 10.

The main point of an automatic transmission mechanism $10_3$ is to install a third one-way clutch $F_0$ to control the rotation of said sun gear $S_1$ not to rotate faster than said input shaft 5, and others are same as said four speed automatic transmission mechanism $10_2$. Said third one-way clutch $F_0$ is connected on saif flang 53b to extend from said boss 53, and said boss 53d is installed in case 37d with free rotation. A spline 5e which is made on an inner surface of clutch hub 5a coming from said input shaft 5 connects outer lace. Said third one-way clutch $F_0$ is installed in said boss 53d as inner lace. A return spring 55 for a hydraulic actuator of clutch $C_2$ is laid side by side with said one-way clutch $F_0$.

Said third one-way clutch $F_0$ releases said first clutch $C_1$ before the motion of said brake $B_1$ in the moment of shifting up from third speed to fourth speed, and gives time to the motion of said brake $B_1$, based on the structure to restrain increase of the rotation of said sun gear $S_1$ by said third oneway clutch $F_0$. Furthermore, said one-way clutch $F_0$ makes motion timing easy and gives smooth shifting while shift shock of gear change is prevented.

As same as shift-up, said one-way clutch $F_0$, in the moment of shifting down from fourth speed to third speed, gives first clutch $C_1$ time by releasing first brake $B_1$ which prevents the rotation of sun gear $S_1$ from becoming higher than the rotation of input shaft 5, and makes motion timing easy. And said one-way clutch $F_0$ gives smooth shifting while shift shock of gear change is prevented.

As already shown in FIG. 10, said third one-way clutch $F_0$ is laid between said clutch hub 5a and said boss 53d. on the other hand, said one-way clutch $F_0$ can be laid between said input shaft 5 and said sun gear boss 53.

Figure 11:
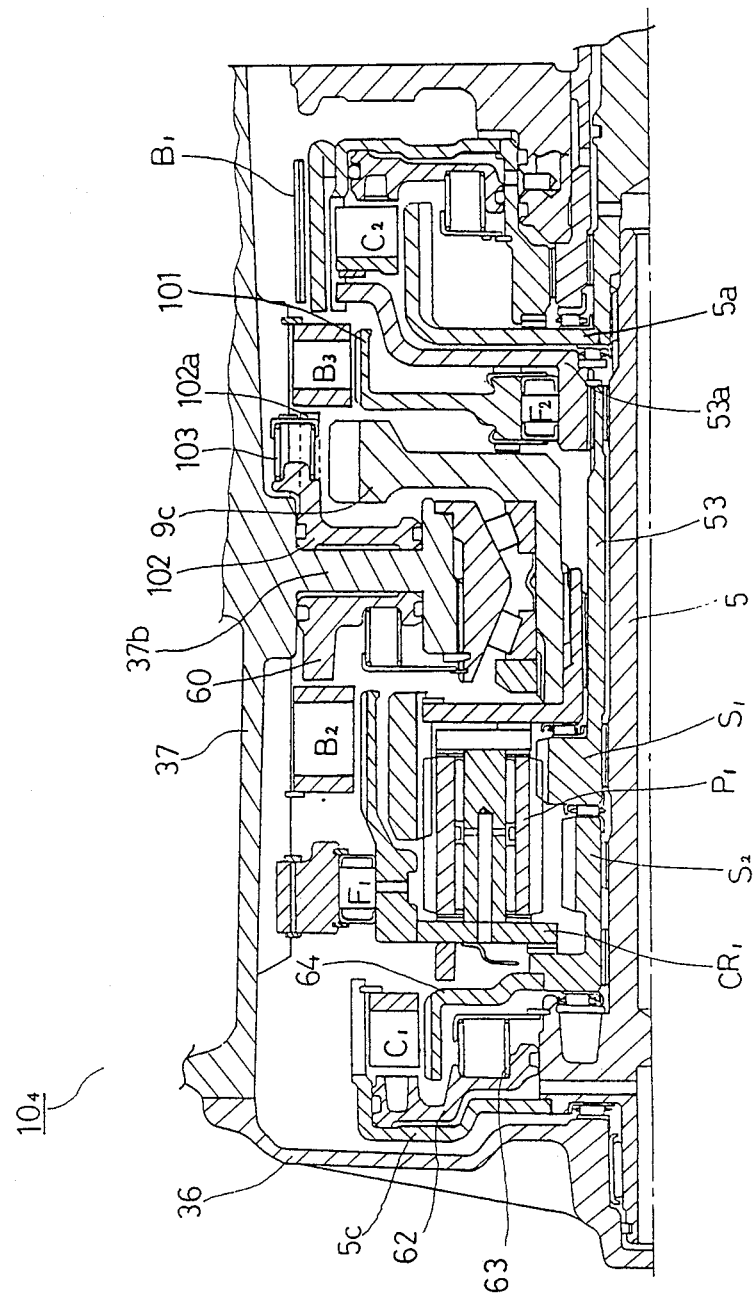
FIG. 11 is a cross sectional view of further modified automatic transmission mechanism.

Another partially modified embodiment is explained in accordance with FIG. 11. The main point of an automatic transmission mechanism $10_4$ is to install third brake $B_3$ laid to restrain said rotation of said sun gear $S_1$ through said second one-way clutch $F_2$ which restrains the rotation of sun gear $S_1$, and others are same as said four speed automatic transmission mechanism $10_3$ or said three speed automatic tranmission mechanism $10_3$.

An inner lace of said second one-way clutch $F_2$ is connected by spline on said sun gear boss 53. An outer lace of said one-way clutch $F_2$ extends toward outer diameter and makes up a connecting portions 101. Said third brake $B_3$ which is multi plate type is laid between said coupling portion 101 and said case 37. At the side of gear 9c on said separator 37b, a cylinder is made and a piston 102 for third brake is installed. From said piston 102, an arm 102a having comb like fins extends over the gear 9c, toward brake $B_3$. A return spring 103 is installed in comb like fins on said arm 102a. Said arm 102a is eliminated in the area where said conter drive gear 9c meshes said coutner driven gear 21.

Figure 12:
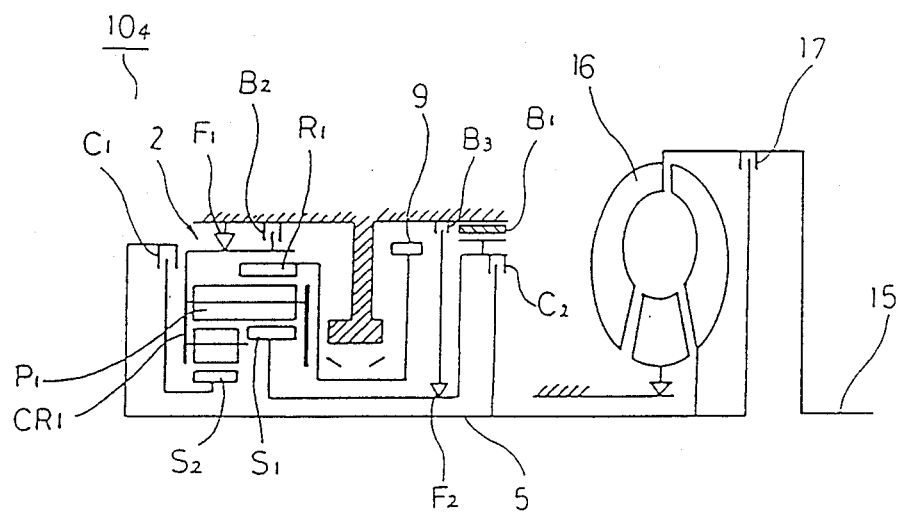
FIG. 12 is a schematic view of transmission mechanism shown in FIG. 11.

Said four speeds automatic transmissin $10_4$ of this partially modified embodiment shown in schematic of FIG. 12 works as shown in FIG. 13.

Figure 14:
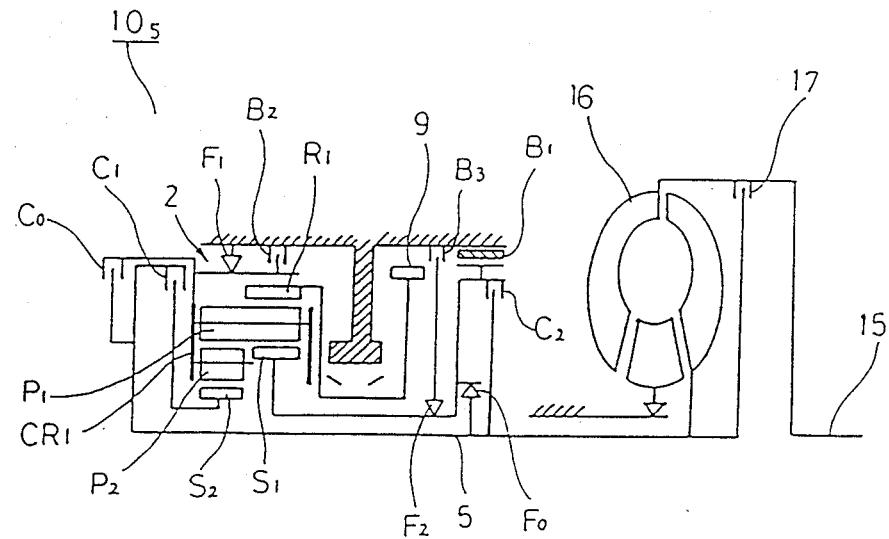
FIG. 14 is a schematic view of an automatic transmission of the embodiment applied to three speed automatic transmission.

Said three speeds automatic transmisison $10_5$ of this partially modified embodiment shown in schematic of FIG. 14 works as shown in FIG. 15. At second speed of D range, said third brake $B_3$ works is addition to said first clutch $C_1$. Then, first sun gear $S_1$ is restained by said second one-way clutch $F_2$ based on the application of third brake $B_3$, said second sun gear $S_2$ which is given rotation from said input shaft 5 rotates said carrier $CR_1$ through said short pinion $P_2$ and said rotation of carrier $CR_1$ is transmitted to said ring gear $R_1$ through said long pinion $P_1$ and is taken up as second speed from said counter drive gear 9. At third speed of D range, third clutch $C_0$ or said second clutch $C_2$ is connected in addition to said first clutch $C_1$, so that said counter drive gear 9 rotates at the same speed as said input shaft 5. At this time, motion and release of third brake $B_3$ has time due to said second one-way clutch $F_2$, so that smooth shifting is available by preventing shift shock of gear change. In this embodiment, all shifting motions are performed through one-way clutch, so that shifting among all speeds are smooth. At 2 range, said first brake $B_1$ works, and restrains said sun gear $S_1$. Due to this motion, second speed can be maintained in coasting. As explained through this chapter, in the present invention, as automatic transmission 10 has said first and second sun gear $S_1$, $S_2$, said long pinion meshing said sun gear $S_1$, said short pinion $P_2$ meshing said long pinion $P_1$ and said second sun gear $S_2$, said carrier $CR_1$ supporting long pinion $P_1$ and said short pinion $P_2$ and said ring gear $R_1$ meshing said long pinion $P_1$, its size can be minimized. Furthermore, as said output mmember 9 encloses said input shaft 5 so that they are located in the center of the automatic transmission mechanism, so, transmission path is shortened. Accordingly, whole body of said mechanism can be short axially, and rational allocation with said additional tranmission mechanism such as said under drive mechanism,etc. is available. This means that physical restriction on mountinng space in a vehicle can be solved.

As said output member 9 is located in the center of said automatic transmission mechanism, it is hard to emit gear noise comparing with a mechanism having an output portion outside axial direction, and this type of mechanism can avoid resonance between said output member 9 and said trans axle cover 36.

In said three speed automatic transmission mechanism $10_1$, said first clutch $C_1$ is located extreme outside axial diarection. In said four speed automatic transmission mechanism $10_2$, as said third clutch $C_0$ is located outside of said first clutch $C_1$, slight modification such as adding said third clutch $C_0$ etc., can make three and four speed automatic transmission mechanism easily. This modification such as adding said third clutch $C_0$ etc., can make three and four speed automatic transmission mechanism easily. This modification can cope with various requirements of wide variation without cost increase, and production facilities and parts can be utilized in common.

By installing said first, second and third one-way clutch ( $F_1$, $F_2$, $F_0$ ) ( in case of said four speed automatic transmission $10_3$, $10_4$ ), transmissions among all speeds are performed through said one-way clutches, then, smooth transmission is obtained whithout shift shock of gear change.

What is claimed is:

1. An automatic transmission having four forward speed automatic transmission mechanism, comprising,
   an input shaft,
   a planetary gear unit having first and second sun gears, a long pinion meshing said first sun gear, a short pinion meshing said long pinion and said second sun gear, a carrier for supporting said long pinion and said short pinion, and a ring gear meshing said long pinion,
   a clutch mechanism having a first clutch for connection the input shaft to the second sun gear, said first clutch being located axially outwardly of said automatic transmission mechanism, said first clutch having a hydraulic actuator and a flange with a hub, said flange operating to connect the first clutch to the input shaft and constituting the hydraulic actuator for the first clutch, a second clutch for connecting the input shaft to the first sun gear, a third clutch for connecting the input shaft to the carrier and having a hydraulic actuator, a flange, a tubular member for the hydraulic actuator, and friction plates situated between the flange of the third clutch and the hub of the first clutch, said third clutch being located axially outside the first clutch, and a drum situated outside the third clutch, said drum being fixed to the flange of the third clutch at one end and to the carrier at the other end,
   an output member connected to the ring gear, said output member being situated in the center of the automatic transmission mechanism so that the output member encloses the input shaft,
   restraining means for restraining the first sun gear and carrier, and
   a transmission case for covering the transmission mechanism and having a main case with a rear portion, and a rear cover for covering the rear portion, said third clutch being covered by the rear cover, said rear cover having an inner extrusion extending toward the inside of the transmission mechanism coaxially with the input shaft, said inner extrusion rotationally supporting the flange and the tubular member for the hydrualic actuator of the third clutch.

2. An automatic transmission described in claim 1, wherein said restraining means comprises,
   a sun first brake to stop rotation of said first sun gear,
   a second brake to stop rotation of said carrier, and
   a first one-way clutch to regualte one way rotation of said carrier.

3. An automatic transmission described in claim 1, wherein said restrainig means comprises,
   a first brake to stop rotation of said first sun gear,
   a second brake to stop rotation of said carrier,
   a first one-way clutch to regualte one way rotation of said carrier, and,
   a third one-way clutch to regualte rotation of said first sun gear not exceeding rotation of said input shaft.

4. An automatic transmission described in calim 1, wherein said restraining means comprises,
   a first brake to stop rotation of said first sun gear,
   a second brake to stop rotation of said carrier,
   a first one-way clutch to control rotaion of said carrier,
   a third one-way clutch to control rotation of said first sun gear not exceeding rotation of input shaft, and
   a third brake to stop rotation of said first sun gear through a second one-way clutch which regulates rotation of said first sun gear.

* * * * *